Patented Feb. 7, 1939

2,146,480

UNITED STATES PATENT OFFICE 2,146,480

PROCESS OF SHUTTING OFF WATER OR OTHER EXTRANEOUS FLUID IN OIL WELLS

Harvey T. Kennedy, Oakmont, Pa., assignor, by mesne assignments, to Gulf Research & Development Company, Pittsburgh, Pa., a corporation of Delaware No Drawing. Application March 18, 1933, Serial No. 661,635. Renewed December 21, 1938

11 Claims. (Cl. 166—21)

This invention relates to processes of shutting off water or other extraneous fluid in oil wells; and it comprises a method of shutting off water from oil wells and the like wherein a liquid material is injected into the well, this material containing a substance or substances capable of reacting with water to form insoluble materials adapted to seal pores in water bearing rock formations through which the well passes; all as more fully hereinafter set forth and as claimed.

The invasion of oil-yielding sands by water entails considerable preventable expense, such as corrosion of equipment, formation of stubborn emulsions, the costs of added pumping and, in many cases, a serious problem of disposal. The necessity of preventing invasion by water from strata above the oil-bearing stratum generally entails the setting of several strings of casing before the producing horizon is reached by the drill and the drilling near the top of the well of a much larger bore hole than is available for the flow of fluid from the well, there being a successive reduction in size as additional strings of casing are set.

Water may enter oil wells from strata overlying the oil-bearing beds, from underlying strata, or from beds or layers intermediate between two oil-bearing beds and often so closely related that it is not readily possible to definitely determine whether the oil and the water lie in distant strata or occupy the same stratum. Water from overlying strata is usually excluded from wells by steel casing. If the stratum in which the casing ends is impermeable, the shut-off is usually quite successful. Water from strata underlying the oil, commonly called bottom water, is usually shut off with a plug of cement, lead, wood or other material, but in many instances such attempts to shut off bottom water are not successful, and the water is either lifted to the surface along with the oil, incurring expense, or it may so retard the entry of oil into the hole as to make the well unprofitable, resulting in the loss of the entire investment involved in leasing, drilling and attempting to produce oil.

My invention relates to new methods of excluding water or other extraneous fluid from oil and gas wells or other earth borings, whether the water invades the well from above the oil-bearing strata, from below the oil-bearing strata or from a source intermediate between two oil or gas-bearing strata. In no case is the flow of oil or gas affected; only that of the water. It comprises the injection into the pores or interstices of rock or sand, of various materials inert to oil but which react with water to form precipitates, or are otherwise hardened by the action of water within the pores. In my invention the water itself is relied upon to produce plugging bodies sealing the pores. The method may be applied either to wells in the process of drilling or to completed wells. In the former case it may be used as a drilling fluid, continuously sealing the passages of porous or cavernous rock or sand, or sealing may be accomplished at intervals as formations to be shut off are encountered. The pressure required to inject these materials into the formations may be that due to the hydrostatic head of the material standing or, in case of its use as a drilling fluid, flowing in the well, or in cases where this is insufficient or the hole is not filled, to pressure applied at the casing head or both.

Many materials may be used in the present invention with production of useful results. The material employed may be one which hydrolyzes with water to form insoluble bodies such as solutions of various mineral or organic salts. Or it may be a suspension in a non-aqueous liquid of a solid material capable of being hydrolyzed; of reacting with water to form new bodies, such for example as a suspension of finely ground Portland cement in alcohol. High alumina cements may be used. Among the mineral salts which have been found useful in the present invention are chlorids and other salts of antimony, bismuth, tin, iron, arsenic, etc. Among the salts containing organic bodies are the various acid soaps or "superfatted soaps", as for example, rosin size. Solutions of these upon dilution with water give deposits by hydrolysis. With all these mineral and organic salts, chemical actions of the rock or mineral formation may co-operate, as in the case of waters coming through a formation containing calcium carbonate, but the primary action in my invention is that of the water itself. This is for the reason that the presence of calcium carbonate is, so to speak, accidental and usually insufficient for practical purposes. A well plugging fluid must be adapted to treat all formations. Action by the impregnating material upon calcium carbonate or other rock constituents often increases the effectiveness of my method. Hydrolyzable chlorids, for example, react readily with calcium carbonate with production of bulky precipitates. Direct action of such chlorids upon rock constituents is advantageous, as is the action of such rock constituents as calcium carbonate in neutralizing acid set free in hydrolysis.

When the material that is injected is a solution of a hydrolyzing salt such as a chlorid or other soluble salt of antimony, bismuth, tin, iron, arsenic and other like substances, upon dilution or contact with waters of the nature of oil field water, surface or connate, a precipitate is formed and seals the pores of the rock. Antimony trichlorid, as an example, in a concentrated solution reacts with water to form a precipitate of antimony oxychlorid leaving hydrochloric acid in the solution. Salts of the other metals named react similarly. The solution of the hydrolyzable salt should be of relatively high concentration; advantageously of a concentration such that upon dilution with water present in the pores of the rock precipitates are formed to an extent sufficient to plug the pores. Usually, the solution is injected into the well under pressure sufficient to force the solution into the rock formation so that the desired hydrolyzing reaction may take place for the most part in pores of the rock remote from the face. In some cases it is possible and advantageous to inject the salt in a fused condition; if necessary, the well and pumping mechanism being heated as by injection of steam before introducing the fused liquid under pressure. Under such conditions the fused liquid penetrates the rock pores and reacts readily with the water present to precipitate solid matter in the pores. For example, antimony trichlorid which melts at 73° C. is particularly suitable for introduction into rock formations where the natural temperature present may be, as is often the case, as high as 90° C. The formation in the pores of the rock of an impervious solid by reaction of the water in the rock with injected liquid effects the desired shutting off of water flow into the well. In some cases it is of particular advantage to introduce the hydrolyzing salt in the form of a colloidal solution. For example, a strong solution of ferric chloride may be partially neutralized by alkali without precipitation, the iron of the salt remaining in solution as a colloidal basic chlorid which upon injection into the rock reacts with the water present to deposit a flocculated precipitate in the pores. A suitable colloidal solution of basic ferric chlorid can be made by dissolving ferric hydroxid in a strong ferric chlorid solution. Ferric sulfate is similarly available upon addition of organic bodies, sugar, tartrates, etc. to the solution. In certain rock formations containing substances acting as oxidizing agents, it is possible to use a strong ferrous sulfate solution as a hydrolyzing reagent to form basic ferric sulfate as a flocculated solid in the rock pores.

To impregnate the rock surrounding a well with a hydrolyzing salt it is often advantageous to dissolve the salt in a non-aqueous solvent such as alcohol, acetone or the like.

To protect the well casings, pumps, piping, etc. against corrosion due to the acid set free in the hydrolyzing action as above described, one or more of the well known corrosion inhibitors is used.

As substitutes for the mineral salts above described, some organic materials are suitable. Organic materials of an acid nature such as superfatted soaps react with water to form insoluble precipitates. Such materials can be injected in solution into the well and forced under pressure into the surrounding formation, the resulting reaction with the water present having the effect of plugging the pores of the formation. In particular, good results are obtained by using an aqueous solution of rosin size for injection into a well producing undue amounts of water.

I have found that hydraulic cements in finely divided form suspended in non-aqueous liquids and injected into the rock formation can be made to plug the pores of the formation; the cement setting by reaction with the water present. Advantageously the cement suspension is made by grinding it in a ball mill with the liquid. Portland cement so ground with alcohol serves well as an agent for sealing off water bearing formations.

Often in oil wells water flooding develops suddenly as a result of a rock stratum becoming denuded of oil and allowing water to enter the well simultaneously with oil running from another stratum. In such cases the present invention has particular utility. Upon forcing the liquid materials reacting with water down the well under pressure, the liquid penetrates both the water bearing stratum and the oil bearing stratum or strata. In the oil bearing stratum, however, little or no water is present and the liquid material injected remains unaffected by the oil. The desired reaction takes place in the water bearing stratum and after a time sufficient to allow hardening of the reaction product in the pores of this stratum, the pressure is released. Whereupon, the liquid material in the oil bearing stratum is ejected and the oil runs freely into the well while the water is shut off in the other stratum.

In a specific example of the present invention an oil well having a bottom hole pressure of 100 pounds per square inch and producing a considerable quantity of water with the oil is first cleared of both water and oil by lowering a pump to the bottom of the well and pumping out the fluid, at the same time pumping gas into the well through the well casing until the pressure is above the bottom hole pressure, say 120 pounds. As soon as the oil and water are all removed from the well, a quantity of a 50 per cent solution of antimony trichlorid in alcohol is first pumped or lubricated into the well through the casing and the gas pressure is increased to say 150 pounds per square inch. Then a further quantity of the antimony trichlorid solution is injected, the total quantity depending upon the size of the hole, the size of the zone requiring to be impregnated and other factors that can be determined by trial.

Ordinarily the quantity of injecting solution required can be determined by the results obtained in shutting off the water. It is advantageous to continue the application of gas pressure after the solution has been injected into the well until it is forced out of the well into the rock formation, and for a considerable time thereafter, in order that more thorough mixing may occur between the injected solution and the water in the formation. When sufficient time has elapsed to drive the liquid, say, 10 feet away from the well, the gas pressure is allowed to drop. The time necessary may be estimated from measurements of permeability of the rock cores taken from the well or by experience in similar wells.

When the pressure is released, the precipitating liquid which has entered the oil bearing strata is forced out again by pressure of the oil which follows it. The liquid which has entered the water bearing strata, however, having reacted with water or with constituents of the rock strata in the presence of water, forms a precipitate in the pores of the strata which obstructs the flow of water therethrough. If the first application of the hydrolyzing solution is not sufficient, the process is repeated until the desired reduction in the flow of water is obtained.

The process of the present invention may be adapted to shutting off gas from an oil well when the gas enters the well through a stratum or strata not producing oil. In such cases it may be necessary to inject water into the gas bearing stratum either prior to or subsequent to injection of a material reacting with water to plug the pores. This procedure has particular advantage when gas is encountered during drilling of a well and it is desired to plug off the gas bearing strata.

What I claim is:—

1. A method of shutting off water from an oil well or the like which comprises injecting into the well a liquid material containing a substance capable of being hydrolyzed upon contacting with water with the formation of insoluble solid matter in pores of water bearing formations through which the well passes, said substance and solid matter being substantially inert to oil in oil bearing formations.

2. A process for shutting off water from an oil well or the like which comprises injecting into the well a solution of a metal salt hydrolyzing with water to precipitate insoluble matter in the pores of rock formations through which the well passes.

3. A process as set forth in claim 2 wherein the solution injected contains a salt of at least one of the metals of a group consisting of antimony, arsenic, bismuth, tin and iron.

4. A process as set forth in claim 2 wherein the metal salt in the solution injected is antimony trichlorid.

5. A process for shutting off water from an oil well or the like which comprises injecting into the well an aqueous solution of an acid organic body capable of being hydrolyzed by chemical reaction on contact with water to precipitate insoluble matter in the pores of water bearing formations through which the well passes, said body being substantially inert to the oil in oil bearing formations.

6. A process as set forth in claim 5 wherein the injected solution contains rosin size.

7. A process of shutting off water from an oil well or the like which comprises injecting into the well a non-aqueous liquid suspension of a finely divided solid capable of being hydrolyzed by chemical reaction on contact with water to form insoluble matter adapted to plug pores in water bearing formations through which the well passes, said liquid suspension being inert to the oil in the oil bearing formations.

8. A process as set forth in claim 7 wherein the injected liquid-solid suspension is a suspension of hydraulic cement in alcohol.

9. In shutting off water from wells passing through a water-bearing stratum and also through a stratum bearing oil or gas without water, a process which comprises forcing into both strata under pressure a liquid material containing a substance capable of being hydrolyzed by chemical reaction on contact with the water in the water bearing stratum to form insoluble matter in the pores of said stratum, said material being substantially inert to the fluid in the non-water-bearing stratum and after a time releasing the pressure from both strata to expel the liquid material from the non-water-bearing stratum.

10. A process of shutting off water from oil wells which penetrate porous water-containing rock formations, which comprises injecting into the well and surrounding rock an oil-inert non-aqueous liquid suspension of a finely divided solid substance characterized by the ability to take up water with production of an insoluble solid plug in the pores of the water-containing rock.

11. A process of shutting off water from oil wells which penetrate porous water-containing rock formations, which comprises injecting into the well and surrounding rock an oil-inert suspension of a finely divided solid substance in an organic liquid which is miscible with water, the solid substance characterized by the ability to take up water with production of an insoluble solid plug in the pores of the water-containing rock.

HARVEY T. KENNEDY.